US011833915B2

(12) United States Patent
Ichikawa (10) Patent No.: US 11,833,915 B2
(45) Date of Patent: Dec. 5, 2023

(54) FUEL CELL VEHICLE

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 17/122,338

(22) Filed: Dec. 15, 2020

(65) Prior Publication Data

US 2021/0188103 A1 Jun. 24, 2021

(30) Foreign Application Priority Data

Dec. 23, 2019 (JP) ................................. 2019-231443

(51) Int. Cl.
*H02J 7/00* (2006.01)
*H02J 7/14* (2006.01)
*B60L 53/00* (2019.01)
*B60L 58/40* (2019.01)
*B60L 50/75* (2019.01)

(52) U.S. Cl.
CPC .............. *B60L 53/00* (2019.02); *B60L 50/75* (2019.02); *B60L 58/40* (2019.02); *H02J 7/0048* (2020.01)

(58) Field of Classification Search
CPC ........... B60L 53/00; B60L 58/40; B60L 50/75
USPC ....................................................... 320/101
See application file for complete search history.

(56) References Cited

U.S. PATENT DOCUMENTS

| | | | |
|---|---|---|---|
| 2007/0275272 A1 | 11/2007 | Muramatsu | |
| 2008/0238355 A1* | 10/2008 | Muramatsu | H01M 8/04567 320/155 |
| 2011/0064976 A1 | 3/2011 | Shimoda | |
| 2011/0148353 A1* | 6/2011 | King | B60L 50/51 320/109 |
| 2012/0107709 A1* | 5/2012 | Mori | H01M 8/04753 429/428 |
| 2012/0115057 A1 | 5/2012 | Yoshida | |
| 2012/0316717 A1* | 12/2012 | Daum | B60L 53/63 701/22 |
| 2014/0248551 A1* | 9/2014 | Kumada | H01M 8/04089 429/444 |
| 2016/0116450 A1* | 4/2016 | Saito | G01L 13/00 73/31.04 |
| 2016/0137095 A1* | 5/2016 | Oda | B60L 58/40 701/22 |
| 2017/0166081 A1* | 6/2017 | Kwon | H01M 8/04567 |

(Continued)

FOREIGN PATENT DOCUMENTS

| | | |
|---|---|---|
| JP | 2008-004538 A | 1/2008 |
| JP | 2009-026563 A | 2/2009 |

(Continued)

*Primary Examiner* — Alexis B Pacheco
(74) *Attorney, Agent, or Firm* — Dinsmore & Shohl LLP (57) ABSTRACT

An FCV includes an FC system and a battery. The FC system includes an FC stack and a boost converter that adjusts output from the FC stack. When a prescribed operation to carry out external charging with a power supply outside the vehicle is not performed for a prescribed time period after system stop (Ready-off) of the FCV under such a condition that an SOC of the battery is lower than a threshold value at the time of system stop, an FDC-ECU controls the boost converter to carry out FC charging by the FC system.

11 Claims, 8 Drawing Sheets

(56) References Cited

U.S. PATENT DOCUMENTS

| | | | |
|---|---|---|---|
| 2017/0203669 A1* | 7/2017 | Kato | H01M 16/006 |
| 2020/0227761 A1* | 7/2020 | Yoshida | B60L 58/20 |
| 2021/0107370 A1* | 4/2021 | Ando | B60L 53/65 |
| 2021/0188129 A1* | 6/2021 | Ichikawa | B60L 58/30 |

FOREIGN PATENT DOCUMENTS

| | | |
|---|---|---|
| JP | 2011-066973 A | 3/2011 |
| WO | 2011004493 A1 | 1/2011 |

* cited by examiner

FUEL CELL VEHICLE

CROSS REFERENCE TO RELATED APPLICATIONS

This nonprovisional application is based on Japanese Patent Application No. 2019-231443 filed with the Japan Patent Office on Dec. 23, 2019, the entire contents of which are hereby incorporated by reference.

BACKGROUND

Field

The present disclosure relates to a fuel cell vehicle.

Description of the Background Art

WO2011/004493 discloses a fuel cell vehicle on which fuel cells are mounted (a fuel cell being referred to as an "FC" and a fuel cell vehicle being referred to as an "FCV" below). The FCV includes an FC stack and a battery. The battery functions as a source of storage of excessive electric power, a source of storage of regenerative energy during regenerative braking, and an energy buffer in case of variation in load with acceleration or deceleration of a vehicle.

What is called a plug-in FCV a power storage of which can be charged with a power supply outside the vehicle has been studied (a power supply outside a vehicle being also referred to as an "external power supply" and charging of the power storage with an external power supply being also referred to as "external charging" below). When external charging was not carried out after system stop of the FCV and a state of charge (SOC) of the power storage is low at the time of system start-up, however, system output which is the sum of output from FCs and output from the power storage is restricted after start of travel and traveling performance may be lowered.

SUMMARY

The present disclosure was made to solve such a problem, and an object of the present disclosure is to suppress lowering in traveling performance after system start-up of an FCV including FCs and a power storage.

An FCV according to the present disclosure includes an FC system, a power storage, a driving device that receives electric power from at least one of the FC system and the power storage and generates travel power, a charger that carries out external charging, and a controller. When an SOC is lower than a threshold value, an output upper limit of the power storage is set to decrease with lowering in SOC. When external charging is not performed under a condition that the SOC is lower than the threshold value at the time of system stop of the FCV, the controller controls the FC system to carry out FC charging for supply of electric power from the FC system to the power storage.

As the SOC lowers and becomes lower than the threshold value, the output upper limit of the power storage lowers, which restricts the system output. The FCV includes a charger that carries out external charging, and by carrying out external charging during system stop, the FCV can be high in SOC at the time of system start-up. External charging, however, may not be carried out during system stop because there is no charging facility at a parking spot or a user forgets external charging.

In this FCV, when external charging is not carried out under the condition that the SOC is lower than the threshold value at the time of system stop, FC charging is carried out. Thus, even though external charging is not carried out during system stop, the SOC can be high at the time of next system start-up and restriction of system output at the time of start of travel after system start-up can be avoided. Therefore, the FCV can suppress lowering in traveling performance after system start-up.

The controller may control the FC system to carry out FC charging when a prescribed operation to carry out external charging is not performed for a prescribed time period after the system stop under the condition that the SOC is lower than the threshold value at the time of system stop.

In the FCV, when an operation to carry out external charging is not performed for a prescribed time period after system stop, it is determined that external charging is not carried out, and when the SOC is lower than the threshold value at the time of system stop, FC charging is carried out. Therefore, according to the FCV, even though external charging is not carried out during system stop, the SOC can be high at the time of next system start-up and restriction of system output at the time of system start-up can be avoided.

When the operation is performed during FC charging, the controller may stop FC charging and carry out external charging.

According to the FCV, when external charging is requested, even during FC charging, FC charging is stopped and external charging is carried out. Therefore, decrease in remaining amount of fuel at the time of system start-up can be suppressed.

When the operation is performed and when an electricity fee for external charging is higher than a prescribed amount, the controller may control the FC system to carry out FC charging without carrying out external charging.

According to the FCV, when an electricity fee for external charging is high, FC charging is carried out even though external charging is requested. Therefore, cost for energy for suppressing lowering in traveling performance after system start-up can be suppressed.

The controller may control the FC system to carry out FC charging when the SOC is lower than the threshold value at the time of system start-up of the FCV.

In the FCV, when the SOC is lower than the threshold value at the time of system start-up, FC charging is carried out. Therefore, restriction of system output due to lowering in SOC can be avoided. Therefore, according to the FCV, lowering in traveling performance after system start-up can be suppressed.

An FCV according to the present disclosure includes an FC system, a power storage, a driving device that receives electric power from at least one of the FC system and the power storage and generates travel power, a charger that carries out external charging, a display operable by a user of the FCV, and a controller. When an SOC is lower than a threshold value, an output upper limit of the power storage is set to decrease with lowering in SOC. The controller controls the display to show an operation section that allows a user to indicate execution of FC charging when the SOC is lower than the threshold value at the time of system stop of the FCV.

In the FCV, an operation section that allows a user to indicate execution of FC charging when the SOC is lower than the threshold value at the time of system stop is shown on the display. Thus, even though external charging is not carried out during system stop, FC charging is carried out during system stop in accordance with a user's instruction, so that the SOC can be high at the time of next system start-up. Therefore, according to the FCV, restriction of system output at the time of system start-up can be avoided, and consequently lowering in traveling performance after system start-up can be suppressed.

The foregoing and other objects, features, aspects and advantages of the present disclosure will become more apparent from the following detailed description of the present disclosure when taken in conjunction with the accompanying drawings.

DETAILED DESCRIPTION

An embodiment of the present disclosure will be described below in detail with reference to the drawings. The same or corresponding elements in the drawings have the same reference characters allotted and description thereof will not be repeated.

First Embodiment

Figure 1:
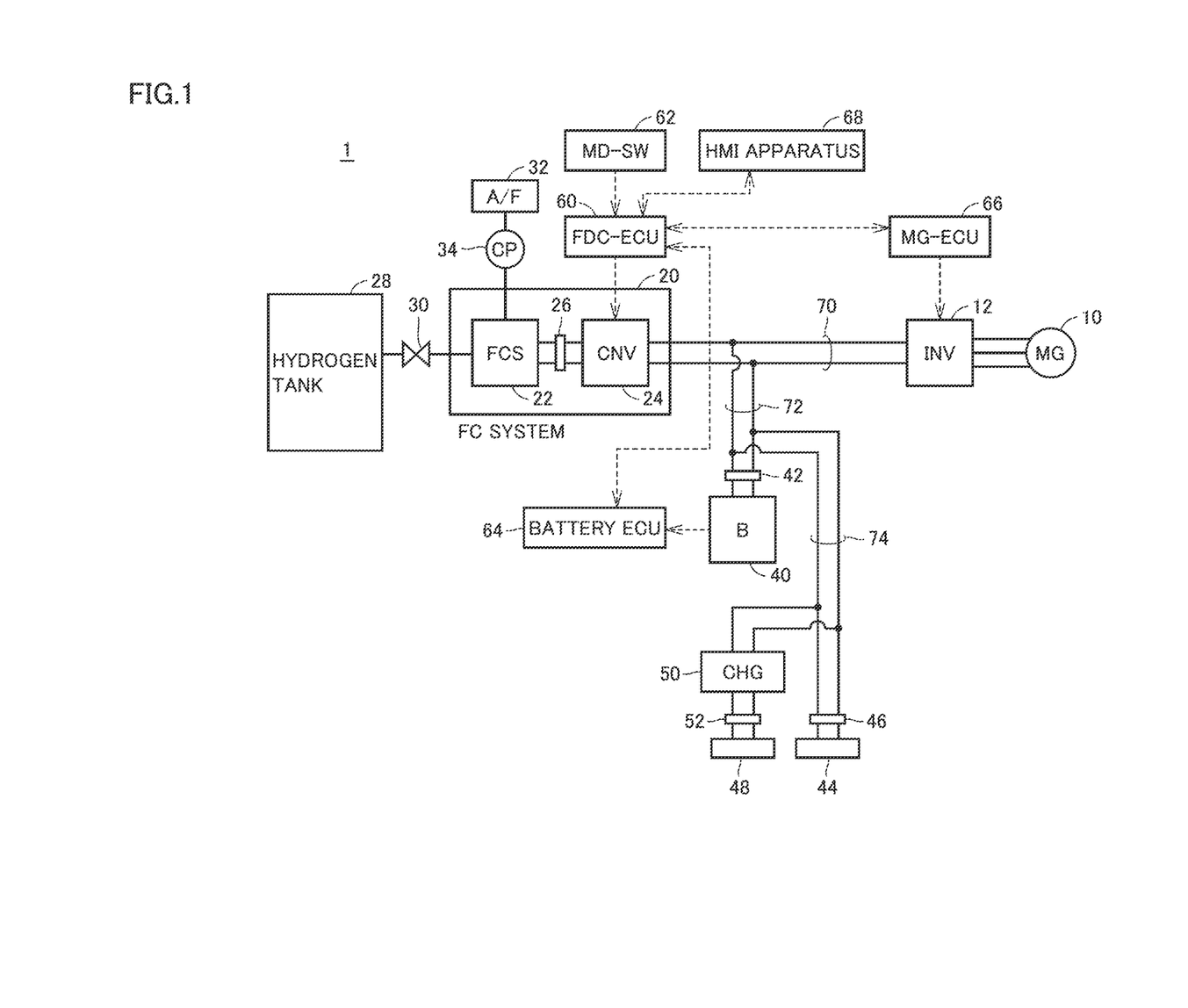
FIG. 1 is a diagram showing an overall configuration of an FCV according to an embodiment of the present disclosure.

FIG. 1 is a diagram showing an overall configuration of an FCV 1 according to an embodiment of the present disclosure. Referring to FIG. 1, FCV 1 includes a motor generator (which is referred to as an "MG" below) 10, an inverter 12, an FC system 20, a hydrogen tank 28, a supply valve 30, an air filter 32, and a compressor 34.

MG 10 is an alternating-current (AC) rotating electric machine, and it is, for example, a three-phase AC synchronous motor having a permanent magnet embedded in a rotor. MG 10 generates rotational driving force as it is driven by inverter 12. Driving force generated by MG 10 is transmitted to a not-shown drive wheel. During braking of FCV 1, MG 10 serves as a generator and generates electric power. Electric power generated by MG 10 is rectified by inverter 12 and rectified electric power can be stored in a battery 40.

Inverter 12 is provided between a power line 70 and MG 10 and drives MG 10 based on a drive signal from an MG-ECU 66 (which will be described later). Inverter 12 is implemented, for example, by a bridge circuit including switching elements of three phases.

FC system 20 includes an FC stack 22, a boost converter 24, and a relay 26. FC stack 22 is, for example, a structure in which a plurality of (for example, several ten to several hundred) cells of a solid polymer type are stacked in series. Each cell is made, for example, by joining a catalyst electrode to each of opposing surfaces of an electrolyte membrane and sandwiching the membrane between conductive separators. Each cell generates electric power as a result of electrochemical reaction between hydrogen supplied to an anode and oxygen (air) supplied to a cathode.

Boost converter 24 boosts electric power (for example, at several hundred V) generated by FC stack 22 based on a control signal from an FDC-ECU 60 (which will be described later) and outputs boosted electric power to power line 70. Relay 26 is provided in an electric path between FC stack 22 and boost converter 24 and opened while a vehicle system remains stopped or while FC system 20 is not used.

Hydrogen tank 28 stores hydrogen as fuel supplied to FC stack 22. Hydrogen tank 28 is a high pressure tank that is light in weight and high in strength and includes, for example, a carbon fiber reinforced plastic layer, and can store, for example, hydrogen at several ten MPa. Hydrogen is supplied from hydrogen tank 28 through supply valve 30 to FC stack 22.

Compressor 34 is a device for supplying oxygen to FC stack 22. Compressor 34 suctions oxygen (air) through air filter 32, compresses oxygen (air), and supplies compressed oxygen (air) to FC stack 22.

FCV 1 further includes battery 40, a direct current (DC) inlet 44, an AC inlet 48, a charger 50, and relays 42, 46, and 52.

Battery 40 is a chargeable and dischargeable power storage. Battery 40 includes a battery assembly constituted of a plurality of cells (for example, several hundred cells). Each cell is, for example, a secondary battery such as a lithium ion battery or a nickel metal hydride battery. A lithium ion secondary battery is a secondary battery containing lithium as a charge carrier, and may include not only a general lithium ion secondary battery containing a liquid electrolyte but also what is called an all-solid-state battery containing a solid electrolyte. A power storage element such as an electric double layer capacitor may be employed instead of battery 40.

Battery 40 is connected to a power line 72 with relay 42 being interposed, and power line 72 is connected to power line 70. Battery 40 stores electric power for driving MG 10 and supplies electric power to inverter 12 through power lines 72 and 70. Battery 40 is charged with electric power generated by MG 10 during braking of FCV 1. Battery 40 can function as an energy buffer that accommodates variation in load caused by acceleration and deceleration of FCV 1 or stores electric power generated by MG 10 during braking of FCV 1.

In the present embodiment, battery 40 can be charged with electric power supplied from a power supply (not shown) outside a vehicle through DC inlet 44 or AC inlet 48 (external charging). Furthermore, battery 40 can also be charged with electric power output from FC system 20 (charging of battery 40 by FC system 20 being also referred to as "FC charging" below).

DC inlet 44 is connected to a power line 74 with relay 46 being interposed, and power line 74 is connected to power line 72. DC inlet 44 is constructed such that a connector of a DC charging cable that extends from a charging stand (not shown) outside the vehicle can be fitted thereto, and DC inlet 44 receives DC power at a high voltage supplied from the charging stand and outputs DC power to power line 74.

AC inlet 48 is connected to charger 50 with relay 52 being interposed. AC inlet 48 is constructed such that a connector of an AC charging cable that extends from a charging stand outside the vehicle can be fitted thereto, and AC inlet 48 receives AC power (for example, system power) supplied from the charging stand and outputs AC power to charger 50. Charger 50 is connected to power line 74 and converts AC power input from AC inlet 48 to a voltage level of battery 40 and outputs DC power to power line 74.

Relay 42 is provided between battery 40 and power line 72 and closed while the system of FCV 1 is ON or while external charging is being carried out. Relay 46 is provided between DC inlet 44 and power line 74 and closed during external charging (DC charging) through DC inlet 44. Relay 52 is provided between AC inlet 48 and charger 50 and closed during external charging (AC charging) through AC inlet 48 and charger 50.

FCV 1 is thus a plug-in FCV in which battery 40 can be charged with a power supply outside the vehicle connected to DC inlet 44 or AC inlet 48, and it can travel with electric power stored in battery 40 by external charging.

FCV 1 further includes FDC-electronic control unit (ECU) 60, a mode switch (MD-SW) 62, a battery ECU 64, MG-ECU 66, and a human machine interface (HMI) apparatus 68. Each of FDC-ECU 60, battery ECU 64, and MG-ECU 66 includes a central processing unit (CPU), a memory (a read only memory (ROM) and a random access memory (RAM)), and an input and output buffer (none of which is shown). The CPU develops a program stored in the ROM on the RAM and executes the program. Processing to be performed by a corresponding ECU is described in a program stored in the ROM.

FDC-ECU 60 calculates output requested of FC system 20 (output electric power from FC system 20) based on travel power requested of FCV 1 and a request for charging and discharging of battery 40, and controls boost converter 24 such that FC system 20 outputs calculated electric power. Travel power requested of FCV 1 is calculated based on an amount of operation of an accelerator pedal and a vehicle speed. Though travel power is calculated by FDC-ECU 60 in the present embodiment, it may be calculated by another ECU (for example, a vehicle ECU (not shown) that controls the entire vehicle in a centralized manner).

FDC-ECU 60 controls output from FC system 20 such that output from FC system 20 does not exceed an output upper limit Wfc and output from battery 40 does not exceed an output upper limit Wout either. In the present embodiment, output upper limit Wfc of FC system 20 is set by FDC-ECU 60 and output upper limit Wout of battery 40 is set by battery ECU 64 based on the SOC and the temperature of battery 40. Output upper limit Wfc of FC system 20 and output upper limit Wout of battery 40 will be described in detail later.

FDC-ECU 60 switches a travel mode in accordance with setting made through mode switch 62. FCV 1 incorporates FC system 20 and battery 40 as power supplies, and battery 40 can store electric power. In this FCV 1, four travel modes in accordance with usage of FC system 20 and battery 40 are available, and a user can select a travel mode by operating mode switch 62. The travel mode will be described in detail later.

Mode switch 62 is a switch for a user to set the travel mode. Mode switch 62 may be a dedicated switch or may be implemented on a touch panel display of HMI apparatus 68.

HMI apparatus 68 provides various types of information to a user of FCV 1 or accepts an operation by the user of FCV 1. HMI apparatus 68 includes a display including a touch panel or a speaker.

Battery ECU 64 monitors a voltage, a current, and a temperature of battery 40. A voltage, a current, and a temperature of battery 40 are detected by not-shown various sensors. Battery ECU 64 calculates an SOC of battery 40 based on values of detected voltage, current, and temperature of battery 40. The calculated SOC value is transmitted to FDC-ECU 60. The SOC may be calculated by FDC-ECU 60 based on values of detected voltage, current, and temperature of battery 40.

Battery ECU 64 sets output upper limit Wout of battery 40. Specifically, battery ECU 64 sets output upper limit Wout to decrease with lowering in SOC when the SOC of battery 40 becomes lower than a threshold value. Then, battery ECU 64 transmits set output upper limit Wout to FDC-ECU 60.

In FCV 1, battery 40 is connected to power line 70 without a converter being interposed, and an amount of charging and discharging of battery 40 is basically determined by a difference between travel power requested by inverter 12 and MG 10 and output from FC system 20. Therefore, charging and discharging and the SOC of battery 40 can be controlled by control of output from FC system 20 by FDC-ECU 60 based on travel power.

In this FCV 1, a target SOC representing a target of the SOC is set by FDC-ECU 60 in accordance with the travel mode. A requested amount of charging and discharging of battery 40 is then calculated based on a difference between the SOC and the target SOC such that the SOC of battery 40 is closer to the target SOC, and output from FC system 20 is controlled by FDC-ECU 60 based on the calculated requested amount of charging and discharging and travel power.

The target SOC will be described in detail later. Various known approaches such as an approach using an open circuit voltage (OCV)-SOC curve (a map) representing relation between the OCV and the SOC and an approach using an accumulated value of currents input to and output from battery 40 can be used as the method of calculating the SOC.

MG-ECU 66 receives a calculated value of travel power requested of FCV 1 from FDC-ECU 60, generates a signal for driving MG 10 with inverter 12 based on travel power, and outputs the signal to inverter 12.

<Description of Travel Mode>

As described above, FCV 1 includes FC system 20 and battery 40. In the present embodiment, four travel modes in accordance with usage of FC system 20 and battery 40 are provided.

Figure 2:
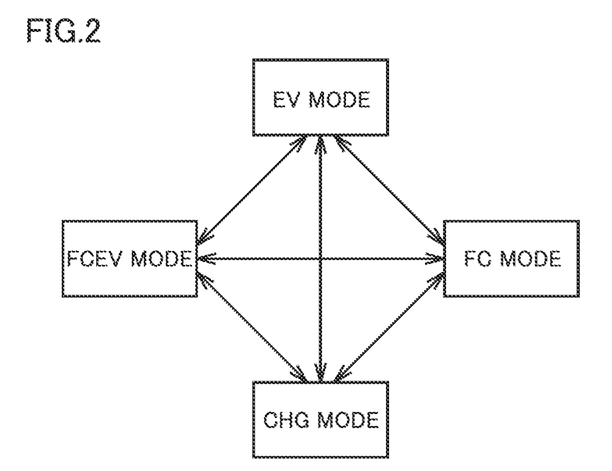
FIG. 2 is a diagram showing a travel mode provided in the FCV.

FIG. 2 is a diagram showing travel modes provided in FCV 1. Referring to FIG. 2, in the present embodiment, four travel modes of an "FC mode," an "FCEV mode," an "EV mode," and a "CHG mode" are provided. A user of FCV 1 can select a desired travel mode from among the travel modes by using mode switch 62.

The FC mode refers to a travel mode for travel basically only with output from FC system 20 until fuel (hydrogen) in FC system 20 runs out. After fuel runs out, FCV 1 travels only with output from battery 40.

In the FC mode, in order to travel only with output from FC system 20, FDC-ECU 60 controls FC system 20 (boost converter 24) based on travel power such that FC system 20 outputs power comparable to power required by inverter 12, that is, travel power (a requested value).

Even in the FC mode, when high travel power is requested by strong pressing of the accelerator pedal and travel power exceeds output upper limit Wfc of FC system 20, insufficiency in power is compensated for by battery 40. When regeneration by MG 10 is carried out as in braking of FCV 1, electric power generated by MG 10 is supplied from inverter 12 to battery 40.

The FCEV mode is a hybrid mode in which output from FC system 20 and output from battery 40 are used in a balanced manner. By way of example, in the FCEV mode, FCV 1 travels with both of output from FC system 20 and output from battery 40 so as to maintain the SOC at the target SOC while FCV 1 travels in accordance with requested travel power. Specifically, FDC-ECU 60 controls FC system 20 (boost converter 24) based on travel power and the SOC of battery 40 such that input to and output from battery 40 are adjusted to maintain the SOC at the target SOC and power required by inverter 12, that is, travel power (a requested value), is supplied.

Even in the FCEV mode, when high travel power is requested by strong pressing of the accelerator pedal and travel power exceeds the output upper limit of FC system 20, electric power equal to or higher than output in accordance with a difference between the SOC and the target SOC is compensated for by battery 40. When regeneration by MG 10 is carried out as in braking of FCV 1, electric power generated by MG 10 is supplied from inverter 12 to battery 40.

The EV mode refers to a travel mode for travel basically only with output from battery 40 without using fuel (hydrogen) in FC system 20.

Even in the EV mode, when high travel power is requested by strong pressing of the accelerator pedal and travel power exceeds output upper limit Wout of battery 40, power comparable to insufficiency in power may be output from FC system 20. When regeneration by MG 10 is carried out as in braking of FCV 1, electric power generated by MG 10 is supplied from inverter 12 to battery 40.

The CHG mode refers to a mode in which the SOC is raised to a prescribed level by positively charging battery 40 with output from FC system 20 when the SOC of battery 40 has lowered.

Even in the CHG mode, when travel power is requested by pressing of the accelerator pedal, electric power is supplied from FC system 20 to inverter 12. Furthermore, when high travel power is requested by strong pressing of the accelerator pedal, electric power is supplied also from battery 40 to inverter 12. When regeneration by MG 10 is carried out as in braking of FCV 1, electric power generated by MG 10 is supplied from inverter 12 to battery 40.

In FCV 1, battery 40 can be charged with a power supply outside a vehicle (external charging) as described above. When external charging was not carried out after system stop (Ready-off) of FCV 1 and the SOC of battery 40 is low at the time of system start-up (Ready-on), however, system output which is the sum of output from FC system 20 and output from battery 40 is restricted after start of travel and traveling performance may be lowered.

Figure 3:
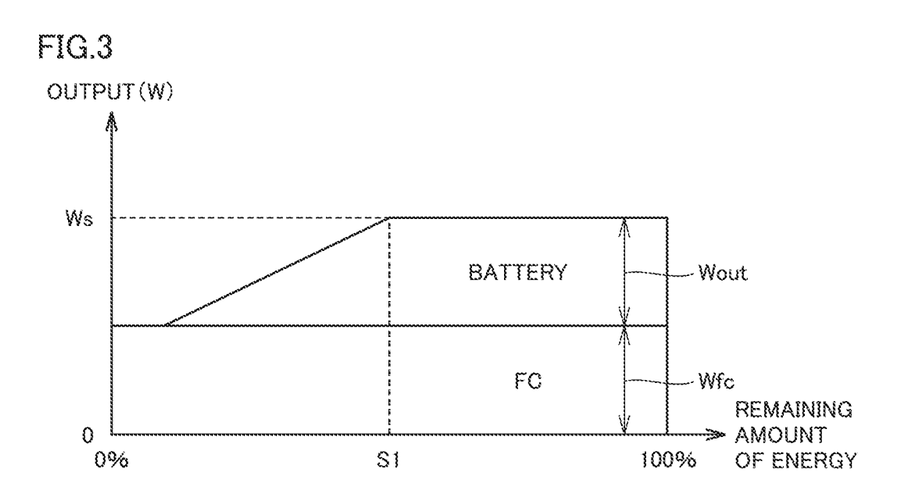
FIG. 3 is a diagram showing relation of a remaining amount of energy in an FC system and a battery with a system output upper limit.

FIG. 3 is a diagram showing relation of a remaining amount of energy in FC system 20 and battery 40 with a system output upper limit. In FIG. 3, the abscissa represents a remaining amount of energy (%) in each of FC system 20 and battery 40, and the ordinate represents the system output upper limit (W) which is the sum of the output upper limit of FC system 20 and the output upper limit of battery 40. The remaining amount of energy on the abscissa represents a remaining amount of hydrogen (100% representing a fully filled state) for FC system 20 and represents the SOC for battery 40.

Referring to FIG. 3, output upper limit Wfc of FC system 20 is constant regardless of the remaining amount of hydrogen. Namely, FC system 20 can output electric power up to output upper limit Wfc regardless of the remaining amount of hydrogen until fuel runs out. On the other hand, when the SOC becomes lower than a threshold value S1, output upper limit Wout of battery 40 decreases with lowering in SOC. Thus, when the SOC of battery 40 becomes lower than threshold value S1, the system output upper limit which is the sum of output upper limit Wfc of FC system 20 and output upper limit Wout of battery 40 decreases with lowering in SOC. When the system output upper limit decreases, traveling performance lowers because of restriction of travel power during acceleration.

Then, in FCV 1 according to the present first embodiment, when external charging with an external power supply is not carried out under such a condition that the SOC is lower than threshold value S1 at the time of Ready-off, the CHG mode is automatically selected. More specifically, when the charging cable is not connected to DC inlet 44 or AC inlet 48 for a prescribed time period after Ready-off under the condition that the SOC is lower than threshold value S1 at the time of Ready-off, it is determined that external charging is not carried out and FC charging by FC system 20 is carried out.

Thus, even though external charging is not carried out during system stop of FCV 1, the SOC can be high at the time of next Ready-on and restriction of system output at the time of start of travel after Ready-on can be avoided. Therefore, lowering in traveling performance after Ready-on can be suppressed.

Figure 4:
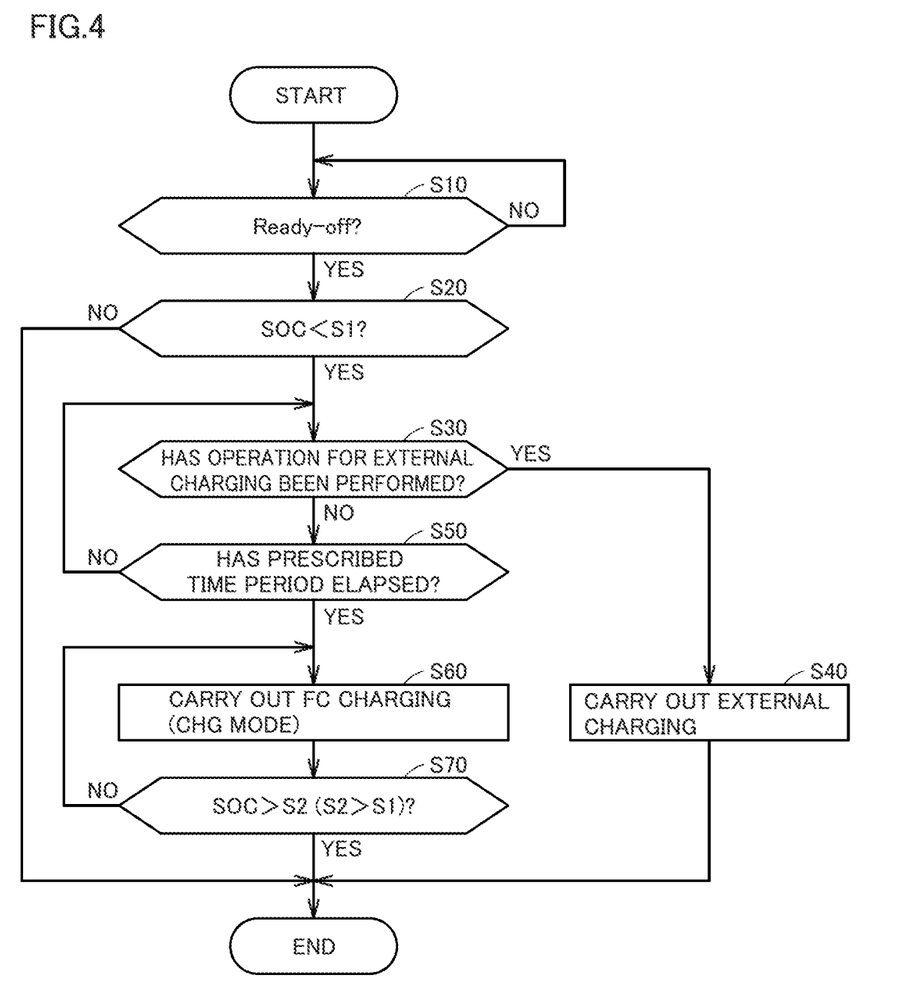
FIG. 4 is a flowchart showing an exemplary procedure in processing performed by an FDC-ECU at the time of Ready-off.

FIG. 4 is a flowchart showing an exemplary procedure in processing performed by FDC-ECU 60 at the time of Ready-off. Some of processing may be allocated to battery ECU 64 or MG-ECU 66 or may be performed by another not-shown ECU (a vehicle ECU that controls the entire vehicle in a centralized manner).

Referring to FIG. 4, when Ready-off (system stop of FCV 1) is requested by an operation onto a start switch (not shown) (YES in step S10), FDC-ECU 60 obtains the SOC of battery 40 from battery ECU 64 and determines whether or not the SOC is lower than threshold value S1 (FIG. 3) (step S20). When the SOC is equal to or higher than threshold value S1 (NO in step S20), a series of processing thereafter is not performed and the process proceeds to end.

When the SOC is determined in step S20 as being lower than threshold value S1 (YES in step S20), FDC-ECU 60 determines whether or not a prescribed operation to carry out external charging has been performed (step S30). Examples of the prescribed operation include an operation to connect the connector of the charging cable to DC inlet 44 or AC inlet 48. When connection between DC inlet 44 or AC inlet 48 and the connector of the charging cable is sensed, it is determined that the operation has been performed.

When FDC-ECU 60 determines that the operation has not been performed (NO in step S30), it determines whether or not a prescribed time period has elapsed (step S50). When the prescribed time period has not elapsed (NO in step S50), the process returns to step S30. In other words, in steps S30 and S50, whether or not an operation to carry out external charging has been performed within a prescribed time period after Ready-off is determined.

When it is determined in step S30 that the operation to carry out external charging has been performed (within the prescribed time period after Ready-off) (YES in step S30), battery 40 is externally charged with an external power supply connected to DC inlet 44 or AC inlet 48 (step S40). Specifically, when the connector of the DC charging cable is connected to DC inlet 44, relays 42 and 46 are closed and battery 40 is charged by a DC charging facility connected to DC inlet 44. When the connector of the AC charging cable is connected to AC inlet 48, relays 42 and 52 are closed and charger 50 is driven and battery 40 is charged by an AC charging facility connected to AC inlet 48.

When it is determined in step S50 that the prescribed time period has elapsed (Yes in step S50), FDC-ECU 60 determines that external charging is not performed, selects the CHG mode, and carries out FC charging for charging battery 40 with FC system 20 (step S60). Specifically, FDC-ECU 60 sets the target SOC of battery 40 to S2 larger than threshold value S1 and drives boost converter 24 of FC system 20 to supply electric power from FC system 20 to battery 40.

During FC charging, FDC-ECU 60 determines whether or not the SOC of battery 40 has exceeded S2 (S2>threshold value S1) (step S70). When the SOC is raised by FC charging and the SOC is determined as having attained to S2 (YES in step S70), FDC-ECU 60 quits FC charging and the process proceeds to end.

As set forth above, in the first embodiment, when the operation to carry out external charging is not performed for a prescribed time period after Ready-off under the condition that the SOC is lower than threshold value S1 at the time of Ready-off, FC system 20 is driven to carry out FC charging. Thus, even though external charging is not carried out during system stop, the SOC can be high at the time of next Ready-on and restriction of system output at the time of start of travel after Ready-on can be avoided. Therefore, according to the first embodiment, lowering in traveling performance after Ready-on can be suppressed.

[First Modification]

When FC charging is started because external charging is not carried out in spite of the SOC being lower than threshold value S1 at the time of Ready-off but when an operation to carry out external charging is performed during FC charging, FC charging may be stopped and external charging may be carried out. Thus, when external charging is requested during FC charging, decrease in remaining amount of fuel can be suppressed by switching from FC charging to external charging.

Figure 5:
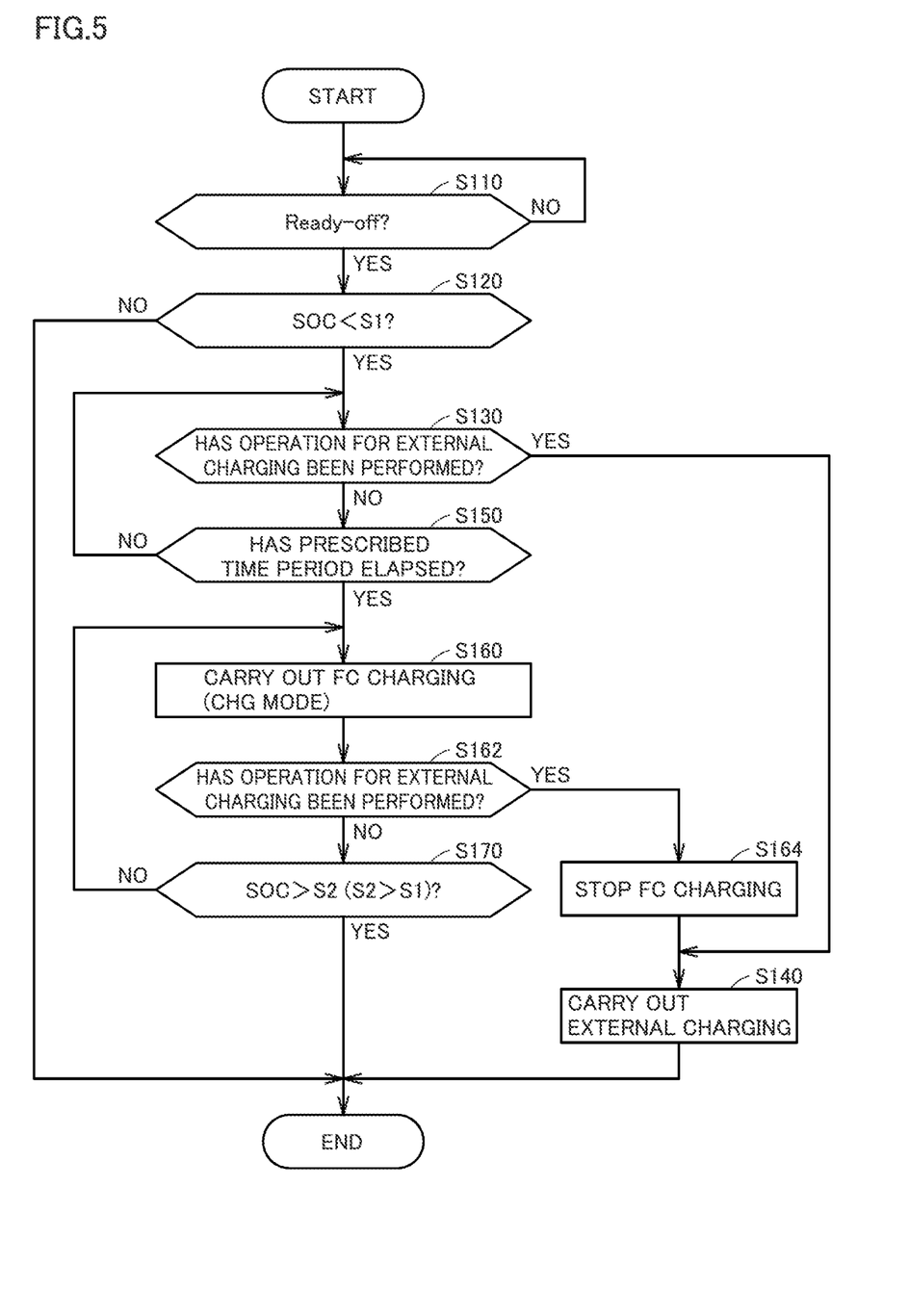
FIG. 5 is a flowchart showing an exemplary procedure in processing performed by the FDC-ECU at the time of Ready-off in a first modification.

FIG. 5 is a flowchart showing an exemplary procedure in processing performed by FDC-ECU 60 at the time of Ready-off in a first modification. This flowchart corresponds to FIG. 4 referred to in the first embodiment.

Referring to FIG. 5, since processing in steps S110 to S170 is the same as the processing in steps S10 to S70 in FIG. 4, description will not be repeated. In the first modification, when FC charging is carried out in step S160, FDC-ECU 60 determines whether or not a prescribed operation to carry out external charging has been performed during FC charging (step S162).

When it is determined that the operation has not been performed (NO in step S162), the process proceeds to step S170 and FDC-ECU 60 determines whether or not the SOC of battery 40 is higher than S2 (S2>threshold value S1).

When it is determined in step S162 that an operation to carry out external charging has been performed during FC charging (YES in step S162), FDC-ECU 60 stops FC charging (step S164). Specifically, FDC-ECU 60 stops driving boost converter 24 of FC system 20.

When FC charging is stopped, the process proceeds to step S140 and FDC-ECU 60 carries out external charging with an external power supply connected to DC inlet 44 or AC inlet 48.

As set forth above, according to the first modification, even during FC charging, when external charging is requested, FC charging is stopped and external charging is carried out. Therefore, decrease in remaining amount of fuel at the time of Ready-on can be suppressed.

[Second Modification]

Even in a case that the SOC is lower than threshold value S1 at the time of Ready-off and an operation to carry out external charging is performed, when an electricity fee for external charging is determined as being relatively high and higher than cost for fuel, FC charging may be carried out without carrying out external charging. Cost for energy (cost for charging) for suppressing lowering in traveling performance after Ready-on can thus be suppressed.

Figure 6:
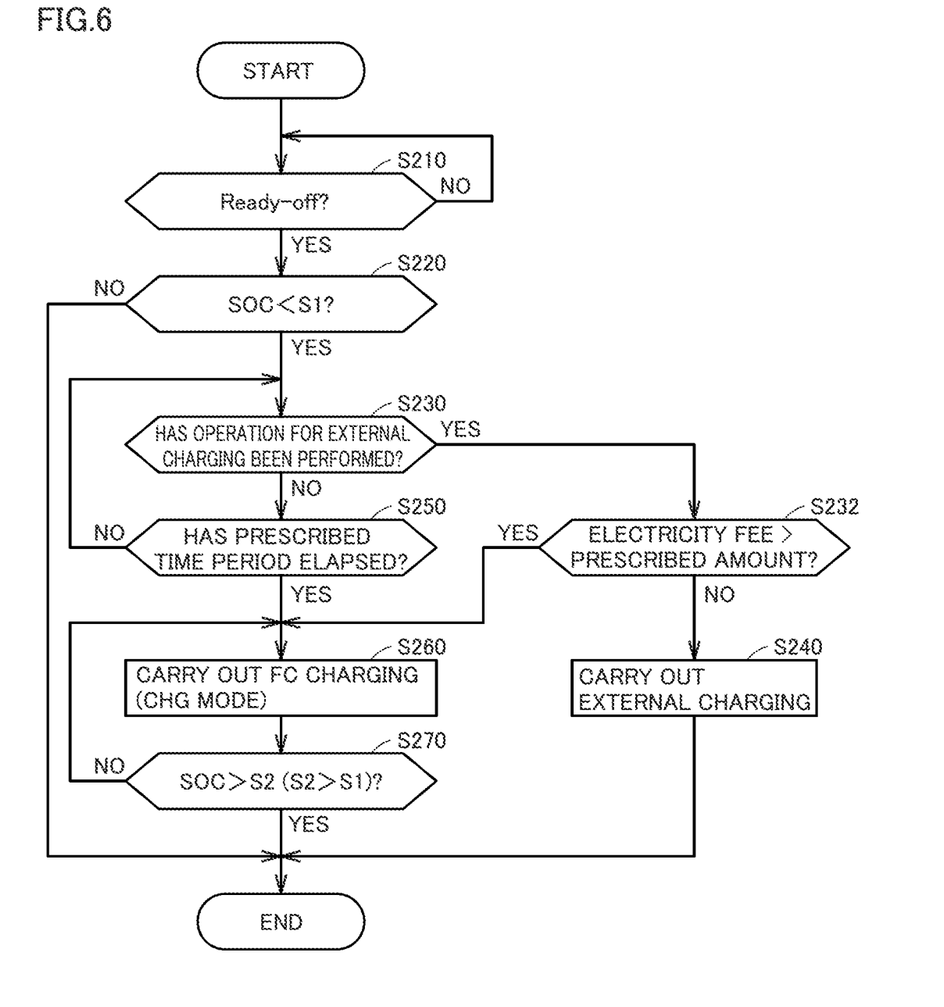
FIG. 6 is a flowchart showing an exemplary procedure in processing performed by the FDC-ECU at the time of Ready-off in a second modification.

FIG. 6 is a flowchart showing an exemplary procedure in processing performed by FDC-ECU 60 at the time of Ready-off in a second modification. This flowchart also corresponds to FIG. 4 referred to in the first embodiment.

Referring to FIG. 6, since processing in steps S210 to S270 is the same as the processing in steps S10 to S70 in FIG. 4, description will not be repeated. In the second modification, when it is determined in step S230 that an operation to carry out external charging has been performed (YES in step S230), FDC-ECU 60 obtains from a server of an electric power utility company, a unit price of an electricity fee in carrying out external charging, and determines whether or not the electricity fee for external charging is higher than a prescribed amount (step S232).

For example, FDC-ECU 60 calculates an amount of charging power until the SOC attains to S2, and when the electricity fee in replenishment of the amount of power with external charging is higher than fuel expenses, the FDC-ECU determines that the electricity fee for external charging is higher than the prescribed amount. The electricity fee for external charging can be calculated by multiplying the obtained unit price of the electricity fee by the amount of charging power. The fuel expenses in replenishment by FC charging can be calculated by obtaining in advance relation between electric power generated by FC system 20 and an amount of fuel consumption as well as a unit price of fuel. Alternatively, when the unit price of the electricity fee in carrying out external charging is higher than a price level on which distinction between a relatively high unit price during daytime and a relatively low unit price during late night is based, the electricity fee for external charging may be determined as being higher than the prescribed amount.

When the electricity fee is determined in step S232 as being higher than the prescribed amount (YES in step S232), the process proceeds to step S260 and FDC-ECU 60 carries out FC charging.

When the electricity fee is determined in step S232 as being equal to or lower than the prescribed amount (NO in step S232), the process proceeds to step S240 and FDC-ECU 60 carries out external charging.

As set forth above, according to the second modification, when the electricity fee for external charging is high, FC charging is carried out in spite of a request for external charging. Therefore, cost for energy for suppressing lowering in traveling performance after Ready-on can be suppressed.

Second Embodiment

In the first embodiment, when external charging is not carried out in spite of the SOC being lower than threshold value S1 at the time of Ready-off, FC charging is carried out. In a second embodiment, when the SOC is lower than threshold value S1 at the time of Ready-off, an operation button that allows a user to indicate execution of FC charging is shown on HMI apparatus 68. The user may thus permit FC charging with the button, or when the user has simply forgotten an operation to carry out external charging, the user can have external charging done by performing the operation and not permitting FC charging.

The FCV according to the second embodiment is identical in overall configuration to FCV 1 according to the first embodiment shown in FIG. 1.

Figure 7:
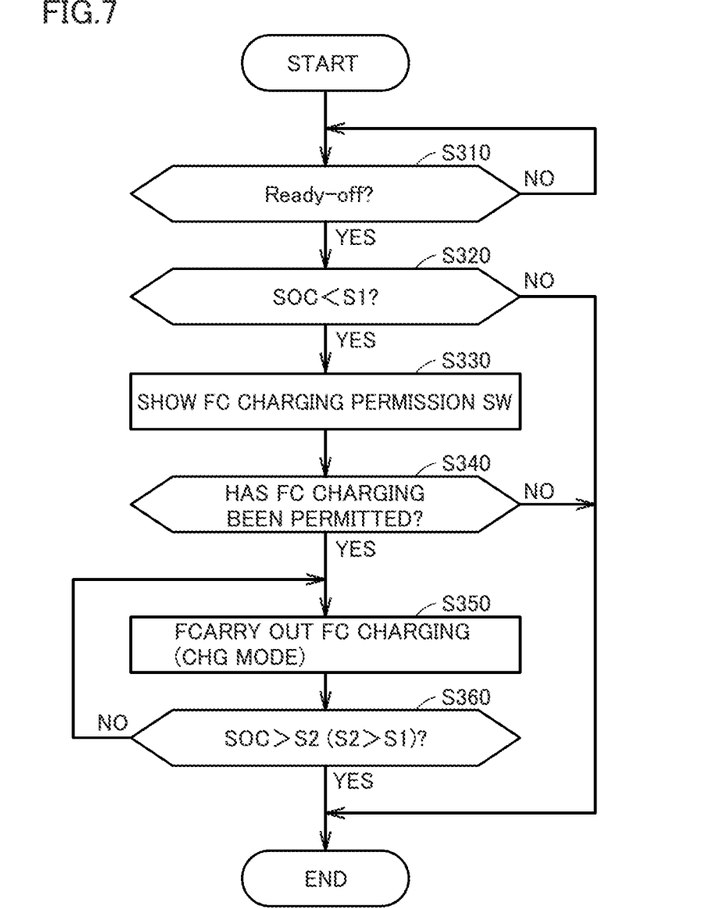
FIG. 7 is a flowchart showing an exemplary procedure in processing performed by the FDC-ECU at the time of Ready-off in a second embodiment.

FIG. 7 is a flowchart showing an exemplary procedure in processing performed by FDC-ECU 60 at the time of Ready-off in the second embodiment. This flowchart corresponds to FIG. 4 referred to in the first embodiment.

Referring to FIG. 7, since processing in steps S310 and S320 is the same as the processing in steps S10 and S20 in FIG. 4, description will not be repeated. In the second embodiment, when the SOC is determined in step S320 as being lower than threshold value S1 (FIG. 3) (YES in step S320), FDC-ECU 60 controls HMI apparatus 68 to show a switch (an operation button) that allows a user to select whether or not to permit execution of FC charging (step S330).

Figure 8:
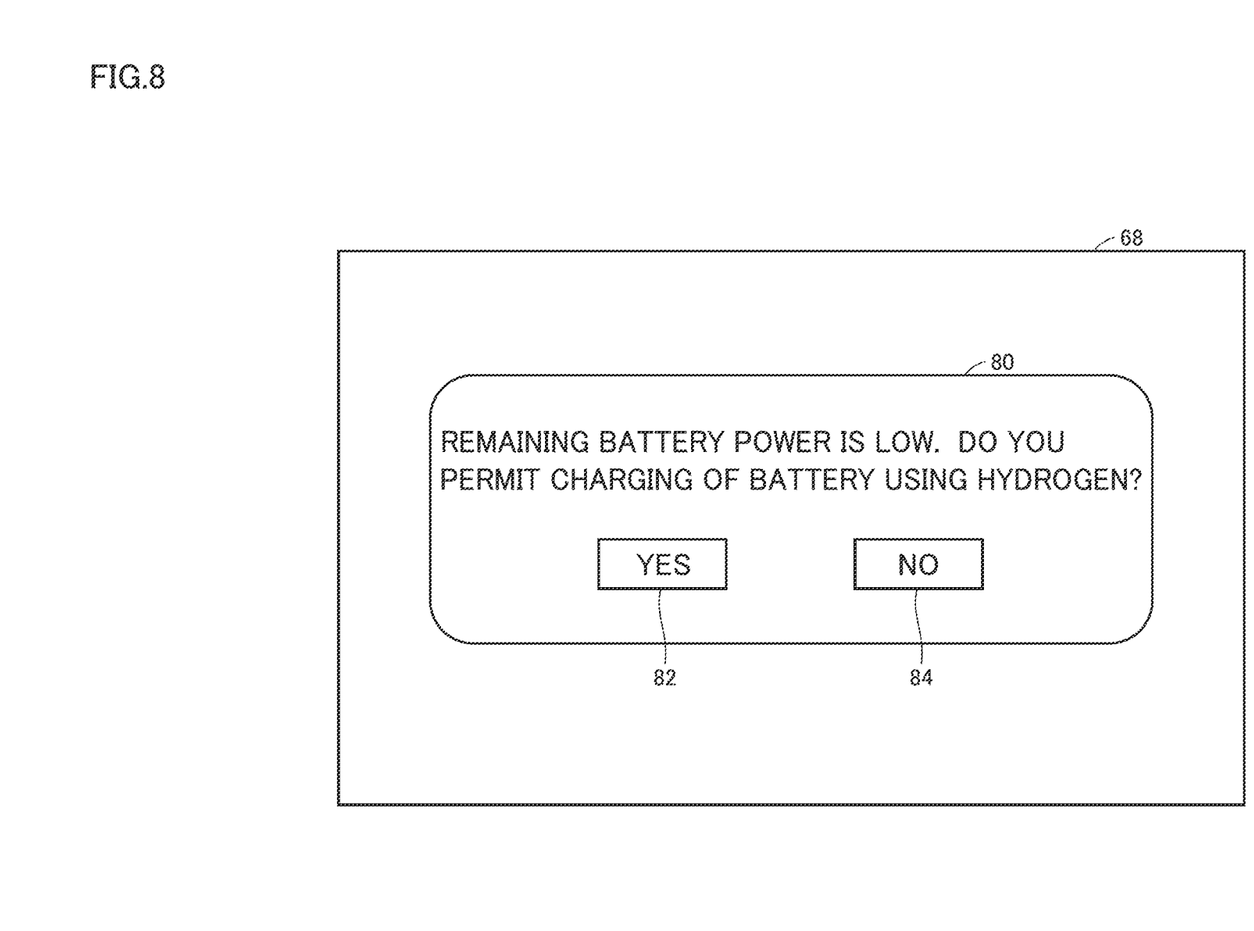
FIG. 8 is a diagram showing an exemplary state of display on an HMI apparatus in step S330 in FIG. 7.

FIG. 8 is a diagram showing an exemplary state of display on HMI apparatus 68 in step S330 in FIG. 7. Referring to FIG. 8, a pop-up screen 80 is shown on the touch panel display of HMI apparatus 68. On pop-up screen 80, an input section 82 for indicating permission of FC charging and an input section 84 for indicating non-permission of FC charging are shown, for example, together with a character string "REMAINING BATTERY POWER IS LOW. DO YOU PERMIT CHARGING OF BATTERY (FC charging) USING HYDROGEN?" When the user touches input section 82, FC charging is permitted, and when the user touches input section 84, FC charging is not permitted.

Referring again to FIG. 7, FDC-ECU 60 determines whether or not the user has permitted FC charging on HMI apparatus 68 (step S340). Then, when FC charging has been permitted (YES in step S340), the process proceeds to step S350 and FDC-ECU 60 carries out FC charging. Since processing in steps S350 and S360 is the same as the processing in steps S60 and S70 in FIG. 4, description will not be repeated.

When FC charging is not permitted (NO in step S340), the process proceeds to end without steps S350 and S360 being performed. Though not particularly shown, when an operation to carry out external charging is thereafter performed, external charging is carried out.

As set forth above, in the second embodiment, when the SOC is lower than threshold value S1 at the time of Ready-off, the operation button (input sections 82 and 84) that allows a user to indicate execution of FC charging is shown on HMI apparatus 68. Thus, even though external charging is not carried out during system stop, FC charging is carried out during system stop in accordance with an instruction from a user and the SOC can be high at the time of next Ready-on. Therefore, according to the second embodiment, restriction of system output at the time of Ready-on can be avoided, and consequently lowering in traveling performance after Ready-on can be suppressed.

Third Embodiment

In the first embodiment, when external charging is not carried out under the condition that the SOC of battery 40 is lower than threshold value S1 at the time of Ready-off, FC charging is carried out. In a third embodiment, FC charging is carried out when the SOC is lower than threshold value S1 at the time of Ready-on.

The FCV according to the third embodiment is also identical in overall configuration to FCV 1 according to the first embodiment shown in FIG. 1.

Figure 9:
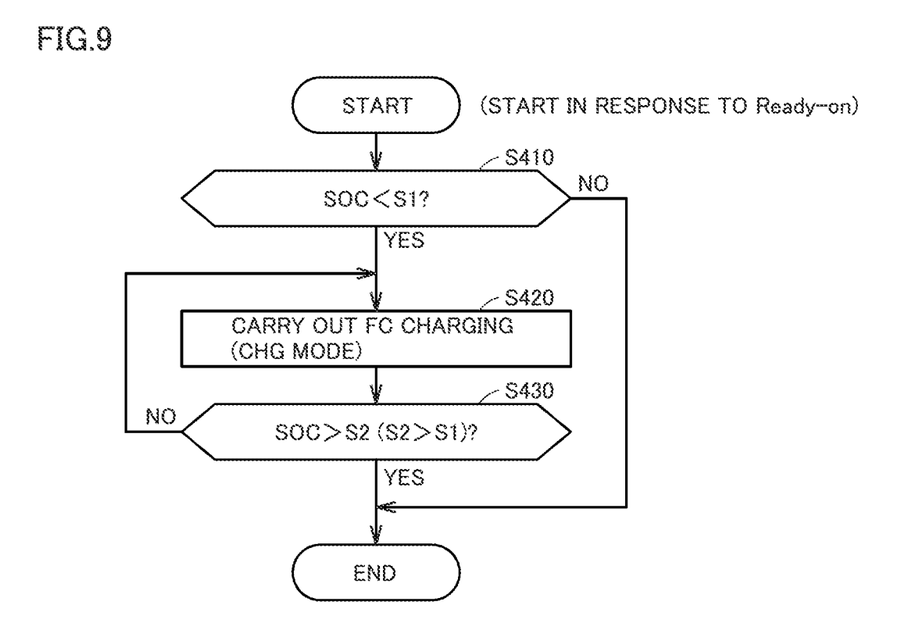
FIG. 9 is a flowchart showing an exemplary procedure in processing performed by the FDC-ECU at the time of Ready-on in a third embodiment.

FIG. 9 is a flowchart showing an exemplary procedure in processing performed by FDC-ECU 60 at the time of Ready-on in the third embodiment. A series of processing shown in this flowchart is started in response to Ready-on.

Referring to FIG. 9, FDC-ECU 60 obtains the SOC of battery 40 from battery ECU 64 and determines whether or not the SOC is lower than threshold value S1 (FIG. 3) (step S410). When the SOC is equal to or higher than threshold value S1 (NO in step S410), the process proceeds to end without the series of processing thereafter being performed.

When the SOC is determined in step S410 as being lower than threshold value S1 (YES in step S410), FDC-ECU 60 selects the CHG mode regardless of a state of mode switch 62 (FIG. 1) and carries out FC charging (step S420). Specifically, FDC-ECU 60 sets the target SOC of battery 40 to S2 larger than threshold value S1 and drives boost converter 24 of FC system 20 such that electric power is supplied from FC system 20 to battery 40.

While FC charging is being carried out, FDC-ECU 60 determines whether or not the SOC of battery 40 has exceeded S2 (S2>threshold value S1) (step S430). When the SOC is raised by FC charging and the SOC is determined as having attained to S2 (YES in step S430), FDC-ECU 60 quits FC charging and the process proceeds to end.

Though not particularly shown, FDC-ECU 60 thereafter switches the travel mode in accordance with setting made through mode switch 62 (FIG. 1).

As set forth above, in the third embodiment, FC charging is carried out when the SOC is lower than threshold value S1 at the time of Ready-on. Therefore, restriction of system output due to lowering in SOC can be avoided. Therefore, according to the third embodiment, lowering in traveling performance after Ready-on can be suppressed.

The third embodiment may be combined with the first embodiment and the modifications thereof as well as the second embodiment. Specifically, when the SOC is lower than threshold value S1 at the time of Ready-off, the processing shown in the first embodiment and the modifications thereof as well as the second embodiment may be performed and processing shown in FIG. 9 may further be performed at the time of next Ready-on.

Though embodiments of the present disclosure have been described above, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A fuel cell vehicle comprising:
a fuel cell system;
a power storage;
a driving device that receives electric power from at least one of the fuel cell system and the power storage and generates travel power;
a charger that carries out external charging for charging the power storage with a power supply outside the fuel cell vehicle, when an SOC of the power storage is lower than a threshold value, an output upper limit of the power storage decreases with lowering in the SOC; and an electronic control unit that controls the fuel cell system to carry out fuel cell charging when the external charging is not performed under a condition that the SOC is lower than the threshold value at time of system stop of the fuel cell vehicle, the fuel cell charging being charging for supply of electric power from the fuel cell system to the power storage to increase a SOC of the power storage for a system start-up of the fuel cell vehicle.

2. The fuel cell vehicle according to claim 1, wherein the electronic control unit controls the fuel cell system to carry out the fuel cell charging when a prescribed operation to carry out the external charging is not performed for a prescribed time period after the system stop under the condition that the SOC is lower than the threshold value at the time of the system stop.

3. The fuel cell vehicle according to claim 2, wherein when the operation is performed during the fuel cell charging, the electronic control unit stops the fuel cell charging and carries out the external charging.

4. The fuel cell vehicle according to claim 2, wherein when the operation is performed and when an electricity fee for the external charging is higher than a prescribed amount, the electronic control unit controls the fuel cell system to carry out the fuel cell charging without carrying out the external charging.

5. The fuel cell vehicle according to claim 1, wherein when the SOC is lower than the threshold value at the time of system start-up of the fuel cell vehicle, the electronic control unit controls the fuel cell system to carry out the fuel cell charging.

6. A fuel cell vehicle comprising:
a fuel cell system;
a power storage;
a driving device that receives electric power from at least one of the fuel cell system and the power storage and generates travel power;
a charger that carries out external charging for charging the power storage with a power supply outside the fuel cell vehicle;
a display operable by a user of the fuel cell vehicle, when an SOC of the power storage is lower than a threshold value, an output upper limit of the power storage decreases with lowering in the SOC; and
an electronic control unit that controls the display to show an operation section that allows a user to indicate execution of fuel cell charging when the SOC is lower than the threshold value at time of system stop of the fuel cell vehicle, the fuel cell charging being charging for supply of electric power from the fuel cell system to the power storage to increase a SOC of the power storage for a system start-up of the fuel cell vehicle.

7. A fuel cell vehicle comprising:
a fuel cell system;
a power storage;
a driving device that receives electric power from at least one of the fuel cell system and the power storage and generates travel power;
a charger that carries out external charging for charging the power storage with a power supply outside the fuel cell vehicle, when an SOC of the power storage is lower than a threshold value, an output upper limit of the power storage being set to decrease with lowering in the SOC to reduce a system output which is a sum of output from the fuel cell system and output from the power storage; and
an electronic control unit that controls the fuel cell system to carry out fuel cell charging when the external charging is not performed under a condition that the SOC is lower than the threshold value at time of system stop of the fuel cell vehicle, the fuel cell charging being charging for supply of electric power from the fuel cell system to the power storage to increase a SOC of the power storage for a system start-up of the fuel cell vehicle.

8. The fuel cell vehicle according to claim 7, wherein the electronic control unit controls the fuel cell system to carry out the fuel cell charging when a prescribed operation to carry out the external charging is not performed for a prescribed time period after the system stop under the condition that the SOC is lower than the threshold value at the time of the system stop.

9. The fuel cell vehicle according to claim 8, wherein when the operation is performed during the fuel cell charging, the electronic control unit stops the fuel cell charging and carries out the external charging.

10. The fuel cell vehicle according to claim 8, wherein when the operation is performed and when an electricity fee for the external charging is higher than a prescribed amount, the electronic control unit controls the fuel cell system to carry out the fuel cell charging without carrying out the external charging.

11. The fuel cell vehicle according to claim 7, wherein when the SOC is lower than the threshold value at the time of system start-up of the fuel cell vehicle, the electronic control unit controls the fuel cell system to carry out the fuel cell charging.

* * * * *